(12) United States Patent
Ratzlaff et al.

(10) Patent No.: US 10,570,767 B2
(45) Date of Patent: Feb. 25, 2020

(54) GAS TURBINE ENGINE WITH A COOLING FLUID PATH

(71) Applicant: General Electric Company, Schenectady, NY (US)

(72) Inventors: Jonathan Russell Ratzlaff, Loveland, OH (US); Ronald Scott Bunker, West Chester, OH (US)

(73) Assignee: General Electric Company, Schenectady, NY (US)

( * ) Notice: Subject to any disclaimer, the term of this patent is extended or adjusted under 35 U.S.C. 154(b) by 824 days.

(21) Appl. No.: 15/016,645

(22) Filed: Feb. 5, 2016

(65) Prior Publication Data

US 2017/0226882 A1 Aug. 10, 2017

(51) Int. Cl.
*F01D 11/02* (2006.01)
*F01D 5/08* (2006.01)

(52) U.S. Cl.
CPC .............. *F01D 11/02* (2013.01); *F01D 5/082* (2013.01); *F05D 2220/32* (2013.01); *F05D 2240/10* (2013.01); *F05D 2240/24* (2013.01); *F05D 2250/184* (2013.01); *F05D 2260/20* (2013.01)

(58) Field of Classification Search
CPC ................... F01D 11/001; F01D 11/02; F01D 11/00–11/24; F01D 5/081; F01D 5/082; F05D 2200/32; F05D 2240/10; F05D 2240/24; F05D 2250/184; F05D 2260/20
See application file for complete search history.

(56) References Cited

U.S. PATENT DOCUMENTS

| 3,761,200 | A  | 9/1973  | Gardiner       |
| 5,222,742 | A  | 6/1993  | Roberts        |
| 6,506,016 | B1 | 1/2003  | Wang           |
| 7,121,791 | B2 | 10/2006 | Friedl et al.  |
| 7,578,653 | B2 | 8/2009  | Klasing et al. |
| 8,262,342 | B2 | 9/2012  | Morris et al.  |
| 8,317,465 | B2 | 11/2012 | Smith          |

(Continued)

FOREIGN PATENT DOCUMENTS

| DE | 10 2010 017 489 A1 | 1/2011 |
| EP | 1 939 397 A2       | 7/2008 |

(Continued)

OTHER PUBLICATIONS

First Office Action and Search issued in connection with corresponding CN Application No. 201710063342.1 dated Mar. 27, 2018.

(Continued)

*Primary Examiner* — Jason D Shanske
*Assistant Examiner* — Julian B Getachew
(74) *Attorney, Agent, or Firm* — McGarry Bair PC

(57) ABSTRACT

An apparatus and method of a gas turbine engine comprising a rotor having at least one disk with a rotor defining an axial face and a stator having at least one ring with a stator axial face confronting the rotor axial face, with terminal portions of the axial faces forming a fluid outlet there between. A recess formed in one of the axial faces defines a buffer cavity into which a wing extends from the other of the axial faces and having a surface confronting the fluid outlet. A flow reverser is further provided within at least one of the surface or the terminal portion of the other of the axial faces.

18 Claims, 5 Drawing Sheets

(56) References Cited

U.S. PATENT DOCUMENTS

| | | | |
|---|---|---|---|
| 8,356,975 B2* | 1/2013 | Grover | F01D 9/02 415/191 |
| 8,707,713 B2 | 4/2014 | Levasseur et al. | |
| 9,051,847 B2 | 6/2015 | Aiello et al. | |
| 2007/0224035 A1 | 9/2007 | Nigmatulin | |
| 2010/0008760 A1 | 1/2010 | Morris et al. | |
| 2010/0074733 A1 | 3/2010 | Little | |
| 2014/0037435 A1 | 2/2014 | Porter et al. | |
| 2014/0193243 A1 | 7/2014 | Nallam et al. | |
| 2014/0205443 A1* | 7/2014 | Lee | F01D 11/001 415/170.1 |

FOREIGN PATENT DOCUMENTS

| | | | |
|---|---|---|---|
| EP | 1985808 A2 | 10/2008 | |
| JP | S55-17207 B2 | 5/1980 | |

OTHER PUBLICATIONS

Extended European Search Report and Opinion issued in connection with corresponding EP Application No. 17154134.5 dated Jun. 16, 2017.

Chinese Patent Office; Office Action in Chinese Patent Application No. 201710063342.1; dated Aug. 21, 2019; 6 pages; China.

* cited by examiner

GAS TURBINE ENGINE WITH A COOLING FLUID PATH

BACKGROUND OF THE INVENTION

Turbine engines, and particularly gas or combustion turbine engines, are rotary engines that extract energy from a flow of combusted gases passing through the engine onto a multitude of rotating turbine blades. Gas turbine engines have been used for land and nautical locomotion and power generation, but are most commonly used for aeronautical applications such as for aircraft, including helicopters. In aircraft, gas turbine engines are used for propulsion of the aircraft. In terrestrial applications, turbine engines are often used for power generation.

Gas turbine engines for aircraft comprise multiple compressor stages designed with a plurality of bands of blades, generally circumferentially arranged on disks forming the rotor, rotated by a rotor and bands of static vanes disposed between the rotating blades. The compressor stages compress the air that is then moved to a combustor and a turbine. Seals are provided between the bands and the rotor, limiting airflow leakage to upstream areas of the compressor, which can reduce efficiency of the system. Additionally, a common practice in turbines, a cooling or purge air flow can be introduced into a rotor to cool the rotor and retard the hot gas path air from entering through openings or gaps in the rotor or between the disks and the static bands.

BRIEF DESCRIPTION OF THE INVENTION

In one aspect, embodiments of the invention relate to a gas turbine engine comprising a rotor having at least one disk with a rotor defining an axial face, a stator having at least one ring with a stator axial face confronting the rotor axial face, a recess formed in one of the axial faces to define a buffer cavity, a wing extending into the buffer cavity from the other of the axial faces and having opposing radially inboard and outboard surfaces, a cooling fluid path extending between the rotor and the stator, the fluid path extending through the buffer cavity over the outboard surface of the wing and exiting between terminal portions of the axial faces radially above the outboard surface, and a flow reverser provided within at least one of the outboard surface or the one terminal portion from which the wing extends.

In another aspect, embodiments of the invention relate to a gas turbine engine comprising a rotor having at least one disk with a rotor defining an axial face, a stator having at least one ring with a stator axial face confronting the rotor axial face, with terminal portions of the axial faces forming an fluid outlet there between, a recess formed in one of the axial faces to define a buffer cavity, a wing extending into the buffer cavity from the other of the axial faces and having a surface confronting the fluid outlet, and a flow reverser provided within at least one of the surface or the terminal portion of the other of the axial faces.

In yet another aspect, embodiments of the invention relate to a method of retarding hot air flow in a gas turbine engine from flowing through a cooling air flow path terminating in a fluid outlet between a stator and rotor of the gas turbine engine, the method comprising reversing the hot air flow after entry of the hot air flow into a rim seal cavity.

DESCRIPTION OF EMBODIMENTS OF THE INVENTION

The described embodiments of the present invention are directed to a cooling fluid path formed between a rotor and stator portion of a turbine section in a gas turbine engine. For purposes of illustration, the present invention will be described with respect to the turbine for an aircraft gas turbine engine. It will be understood, however, that the invention is not so limited and may have general applicability within an engine, including compressors, as well as in non-aircraft applications, such as other mobile applications and non-mobile industrial, commercial, and residential applications.

Figure 1:
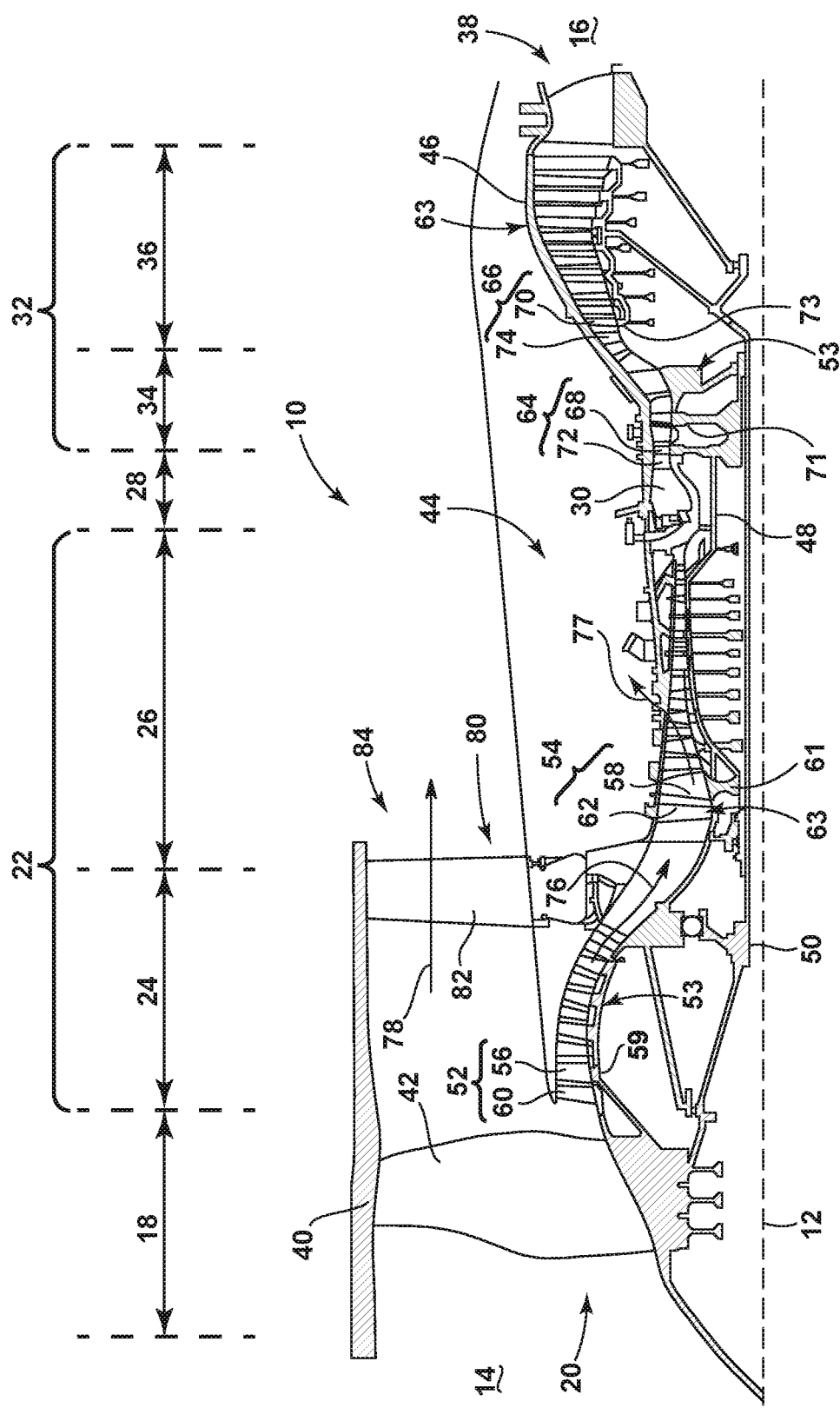
FIG. 1 is a schematic cross-sectional diagram of a gas turbine engine for an aircraft.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 59, which is mounted to the corresponding one of the HP and LP spools 48, 50, with each stage having its own disk 59, 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine vanes 72, 74 can be provided in a ring and can extend radially outwardly relative to the centerline 12, while the corresponding rotating blades 68, 70 are positioned downstream of and adjacent to the static turbine vanes 72, 74 and can also extend radially outwardly relative to the centerline 12, from a blade platform to a blade tip. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having its own disk 71, 73. The vanes 72, 74 for a stage of the compressor can be mounted to the core casing 46 in a circumferential arrangement.

The portions of the engine 10 mounted to and rotating with either or both of the spools 48, 50 are also referred to individually or collectively as a rotor 53. The stationary portions of the engine 10 including portions mounted to the core casing 46 are also referred to individually or collectively as a stator 63.

In operation, the airflow exiting the fan section 18 is split such that a portion of the airflow is channeled into the LP compressor 24, which then supplies pressurized ambient air 76 to the HP compressor 26, which further pressurizes the ambient air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the ambient air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally the combustor 30 and components downstream of the combustor 30, especially the turbine section 32, with the HP turbine 34 being the hottest portion as it is directly downstream of the combustion section 28. Other sources of cooling fluid can be, but is not limited to, fluid discharged from the LP compressor 24 or the HP compressor 26. This fluid can be bleed air 77 which can include air drawn from the LP or HP compressors 24, 26 that bypasses the combustor 30 as cooling sources for the turbine section 32. This is a common engine configuration, not meant to be limiting.

Figure 2:
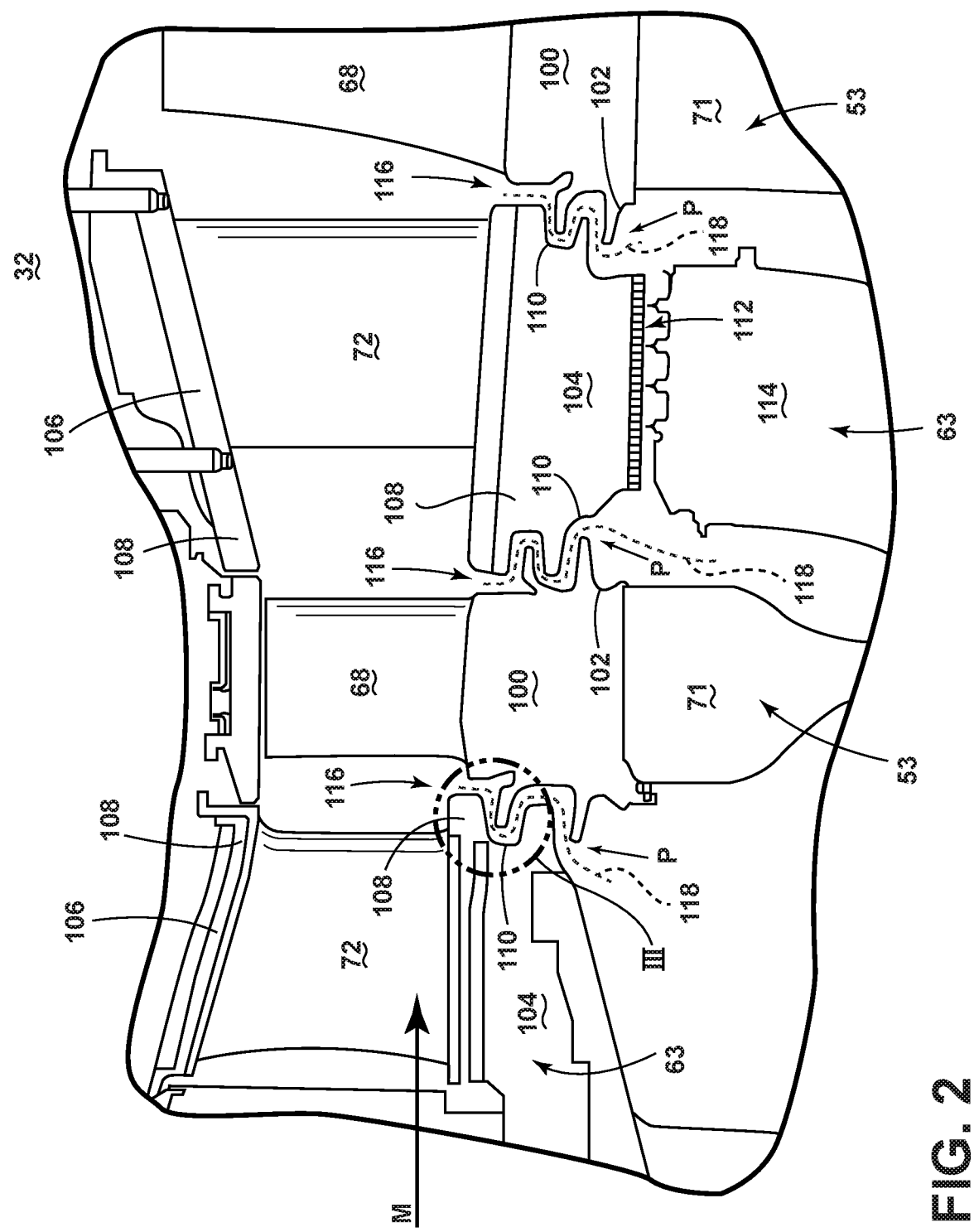
FIG. 2 is a section view of a turbine section of the gas turbine engine of FIG. 1.

FIG. 2 depicts a portion of the turbine section 32 including the stator 63 and the rotor 53, the rotor 53 having at least one disk 71. While the description herein is written with respect to a turbine, it should be appreciated that the concepts disclosed herein can have equal application to a compressor section. Each blade 68 mounts to a blade platform 100 which is further mounted to the disk 71. The blade platform 100 and disk 71 together are part of the rotor 53 defining a rotor axial face 102. The rotor 53 can rotate about the centerline 12, such that the blades 68 rotate circumferentially around the centerline 12.

The stator 63 includes a plurality of vanes 72, each mounted between a radially inner band 104 and a radially outer band 106, defining a ring 108 having a stator axial face 110. A radial seal 112 can mount to a stator disk 114 adjacent to the inner band 104. Each vane 72 is circumferentially spaced apart from each other to at least partially define a path for a mainstream airflow M. Both the rotor and stator axial faces 102, 110 are located in an orthogonal plane to the centerline 12 and include interfaces, gaps, and other seals for assembly purposes of the vanes, blades, and associated hardware.

The mainstream airflow M moves in a forward to aft direction, driving the turbine blades 68. A rim seal cavity 116 is formed between the rotor and stator axial faces 102, 110. The rim seal cavity 116 can have an ingestion path through which some hot gas airflow from the mainstream airflow M can leak into the rim seal cavity 116 further radially inboard causing unwanted heating of portions of the rotor 53 and stator 63. An exemplary cooling fluid path 118 extends between the confronting axial faces 102, 110 of the rotor 53 and the stator 63, through the rim seal cavity 116 which is used to counteract the heating of these portions.

Figure 3:
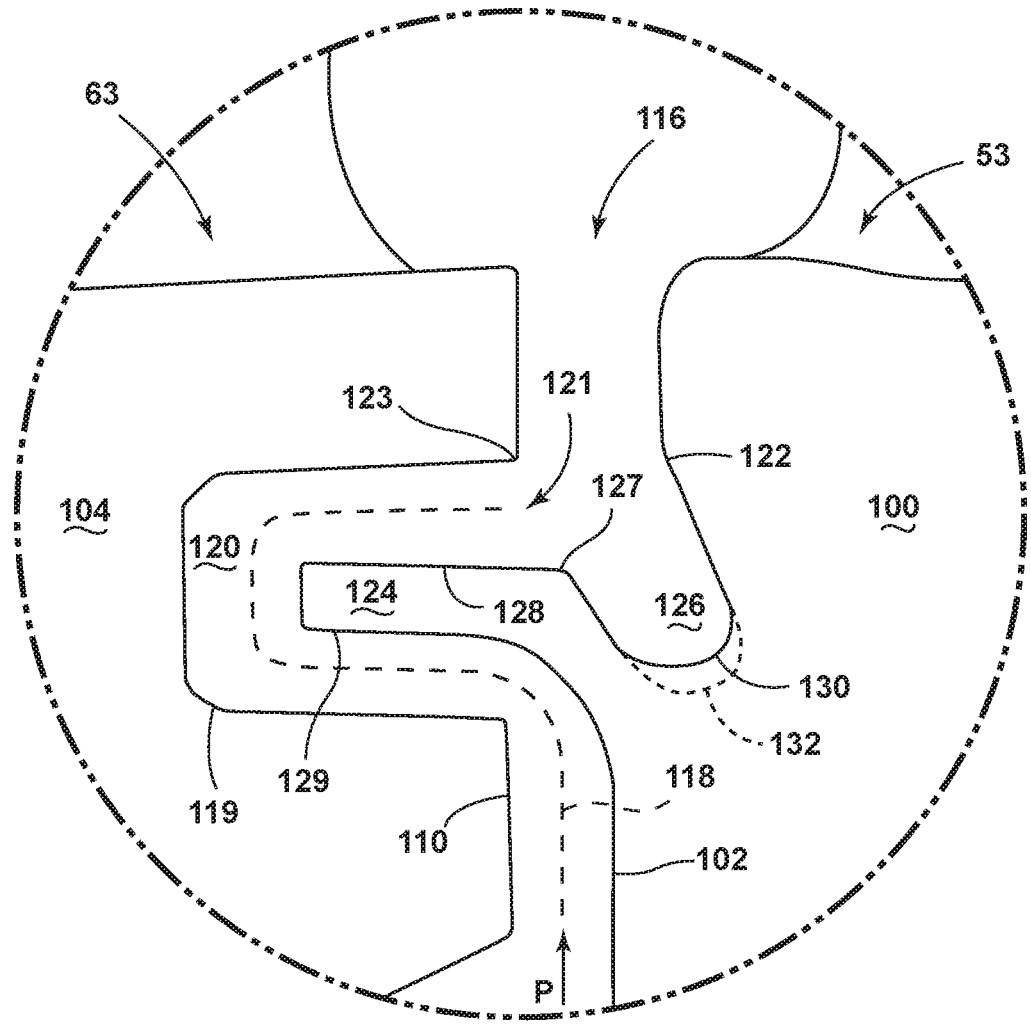
FIG. 3 is an enlarged view of a section of FIG. 2 illustrating a rotor wing disposed in a channel of an upstream stator.

Turning to FIG. 3 an enlarged view of a portion III more clearly details the radial seal 116 which includes a recess 119 formed in one of the axial faces 102, 110 to define a buffer cavity 120. In an exemplary embodiment, the recess 119 is formed in the stator axial face 110 and a wing 124 extends from the rotor axial face 102. The wing 124 can extend from the other of the axial faces 110. The wing 124 includes a surface which comprises a radially outboard surface 128 and a radially inboard surface 129.

The cooling fluid path 118 terminates in a fluid outlet 121 formed between terminal portions 122, 123 of the axial faces 102, 110 radially above the outboard surface 128. A flow reverser 126, comprising a recess 130, is provided within the outboard surface 128 and the terminal portion 122 from which the wing 124 extends. The flow reverser 126 is axial offset from the axial face 102 and adjacent a junction 127, and can have for example a compound curve or bevel, located between the outboard surface 128 and the terminal portion 122.

Commonly, a purge flow P is fed along the cooling fluid path 118 into a buffer cavity 120 between the stator 63 and adjacent rotor 53. The purge flow P is injected into the buffer cavity 120 to counter hot gas ingestion from the mainstream airflow M into the buffer cavity 120. The purge flow P can also cool the buffer cavity 120 and adjacent components, however interaction between the mainstream flow M and the purge flow can be unsteady, decreasing efficiency of the turbine.

Figure 4:
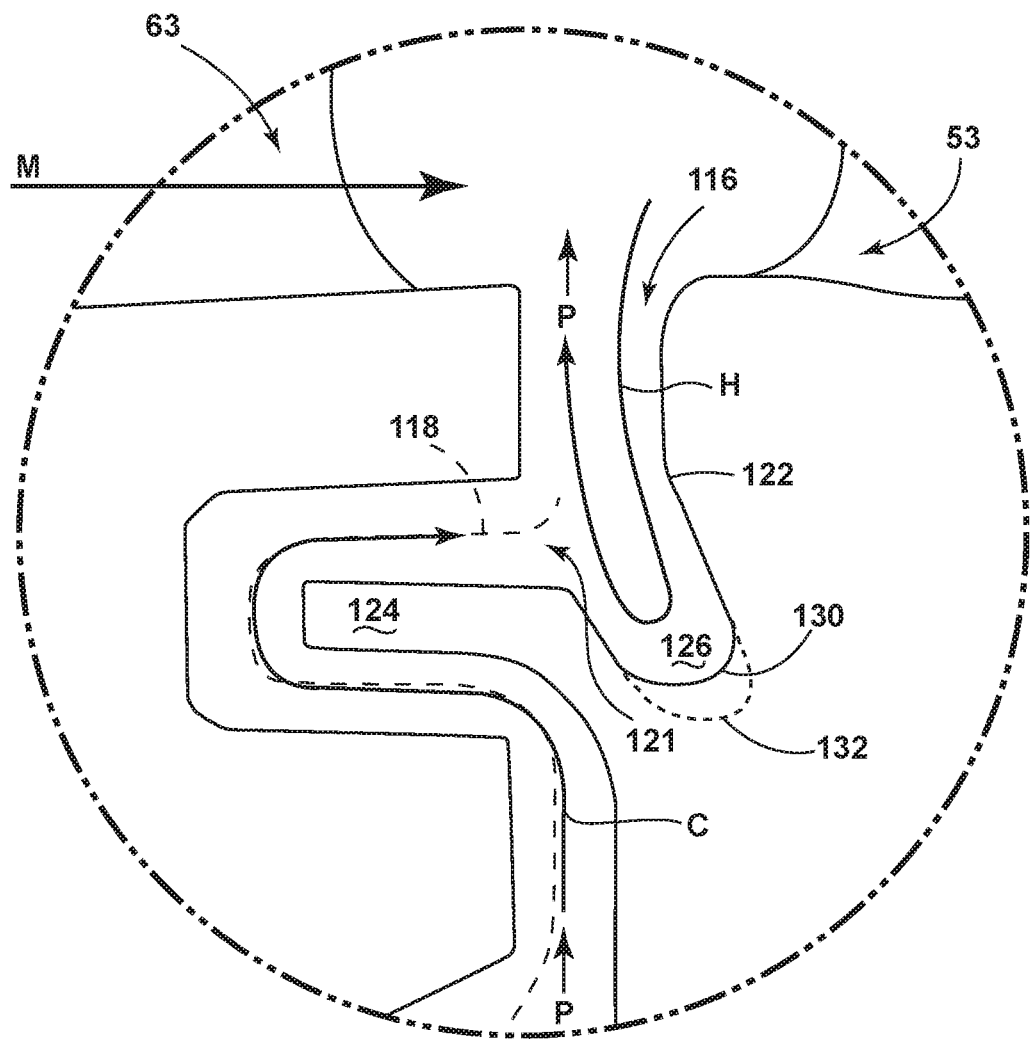
FIG. 4 is the same enlarged section of FIG. 3 illustrating a flow path.

As can be seen in FIG. 4, an example of the flow conditions that can exist is illustrated. The purge flow P comprises a cooling air flow C used to counter hot air flow H from the mainstream airflow M into the buffer cavity 120 caused by the relatively higher pressure of the mainstream flow M. The wing 124 diverts the cooling fluid path 118 in order to move the cooling air flow C around the wing 124 where it exits at the fluid outlet 121 and meets the hot air flow H. The hot air H first flows along the axial face 102 and is turned towards the mainstream flow M by the flow reverser 126. This turn creates a non-contact seal retarding the hot air H from flowing through the cooling fluid path 118.

FIG. 4 also illustrates a method of retarding hot air H in a gas turbine engine 10 from flowing through a cooling air flow path 118 exiting between a stator 63 and rotor 53 of the gas turbine engine 10. The method comprises reversing the hot air flow H after entry of the hot air flow H into the rim seal cavity 116 by turning the hot air flow H with the flow reverser 126 which is fluidly coupled to the cooling air flow path 118. The intersection of the cooling air flow path 118 and the hot air H is an exit point for any purge air P and an entry point for any hot air H, this recessed intersecting region is the fluid outlet 121 for the cooling air flow path 118. The turning occurs downstream of the fluid outlet 121 and upstream of the flow reverser 126. This turning of the hot air flow H reintroduces flow H to the mainstream flow M.

It should be noted that a range of flow conditions is present circumferentially causing the flow reverser 126 to be of lesser or greater efficacy. Depending on the location and flow conditions any form of circumferential non-uniformity in geometry 132, for example periodic, varied, or sinusoidal, can be formed in the flow reverser 126. The radius from the centerline 12 to the recess 130 would therefore change depending on the circumferential non-uniform geometry 132. The flow reverser 126 need not have the same definition at every circumferential location around the rotor. It may be beneficial that it vary in size, shape, or extent relative to the vanes and/or blades.

A plurality of configurations exist regarding the placement and geometry of a flow reverser. The second and third embodiments are similar to the first embodiment, therefore, like parts will be identified with like numerals increasing by 100 and 200 respectively, with it being understood that the description of the like parts of the first embodiment applies to the second and third embodiments, unless otherwise noted.

Figure 5:
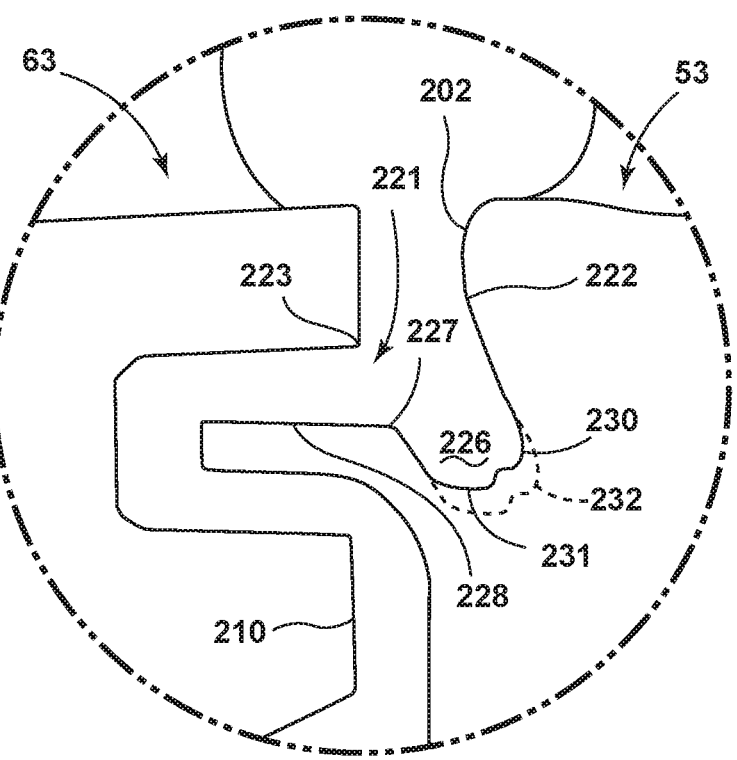
FIG. 5 is a second embodiment of the rotor wing of FIG. 2.

FIG. 5 depicts a second embodiment of a flow reverser 226 having a recess 230 formed in a terminal portion 222 and a recess 231 formed in an outboard surface 228. A junction 227 forms the tip of a smooth arcuate, wavy, or undulating profile formed on an outboard surface 228 and ending on the terminal portion 222 of the axial face 202.

Figure 6:
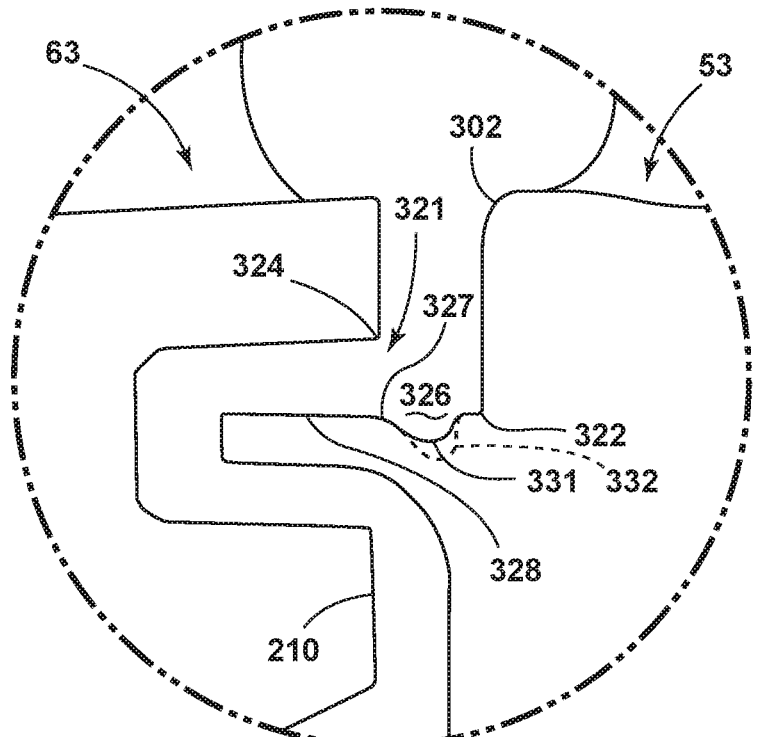
FIG. 6 is a third embodiment of the rotor wing of FIG. 2.

FIG. 6 depicts a third embodiment of a flow reverser 326 having a recess 331 formed in an outboard surface 328 with at least one of a smooth arcuate, wavy, or undulating profile. In this embodiment the flow reverser 326 is adjacent a junction 327 between the outboard surface 328 and a terminal portion 322 where the terminal portion 322 remains relatively smooth and flat.

As depicted herein hot air flow H originates from a point radially above the inner band 104. This hot air flow H then runs down the axial face 102 of the rotor 53 into the flow reverser 126 where it is guided such that it is kicked out radially towards the axial face 110 of the stator 63 becoming purge air P. Benefits of this flow reverser 126 include holding hot air in the recess 130 and then directing it back to the mainstream flow M. The flow reverser 126 placement reduces the mass exchange that normally occurs in the overlapping portions between the stator 63 and rotor 53 which increases durability of the engine 10 while maintaining traditional rotor/stator wings and clearance along the overlapped portions between the stator 63 and rotor 53.

This reduction of mass exchange also allows for less purge flow which improves specific fuel consumption (SFC) and better rim sealing which prevents hot air from ingesting past the buffer cavity and damaging portions of the stator and rotor. The geometry of the flow reverser also increases the effectiveness of the rim seal cavity while maintaining blade weight and manufacturability.

Testing performed of the concepts disclosed herein on a commercial engine showed a reduction in cavity air temperatures at a low purge flow rate. This change in air temperature indicates a reduction in hot gas penetrating beyond the rim seal.

It should be appreciated that application of the disclosed design is not limited to turbine engines with fan and booster sections, but is applicable to turbojets and turbo engines as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gas turbine engine comprising:
   a rotor having at least one disk with a rotor axial face having a rotor terminal portion;
   a stator having at least one ring with a stator axial face, having a stator terminal portion, confronting the rotor axial face;
   a recess formed in one of the rotor or stator axial faces to define a buffer cavity;
   a wing extending into the buffer cavity from the other of the rotor or stator axial faces and having opposing radially inboard and outboard surfaces;
   a cooling fluid path extending between the rotor and the stator, the fluid path extending through the buffer cavity over the outboard surface of the wing and exiting between the rotor and stator terminal portions radially above the outboard surface; and
   a flow reverser provided within the rotor or stator axial face from which the wing extends defining a recess extending radially inward from the radially outboard surface an extent greater than the radially inboard surface.

2. The gas turbine engine of claim 1 wherein the flow reverser is located adjacent a junction between the outboard surface and the rotor or stator axial face from which the wing extends.

3. The gas turbine engine of claim 1 wherein the flow reverser is located at a junction between the outboard surface and the rotor or stator axial face from which the wing extends.

4. The gas turbine engine of claim 1 wherein the outboard surface has at least one of a smooth arcuate, wavy, or undulating profile.

5. The gas turbine engine of claim 1 wherein the outboard surface has a circumferential non-uniform shape that is at least one of periodic, varied, or sinusoidal.

6. The gas turbine engine of claim 1 wherein the wing extends from the axial face of the rotor and the recess is formed in the axial face of the stator.

7. The gas turbine engine of claim 1 wherein the flow reverser extends axially inward from the rotor or stator axial face from which the wing extends.

8. The gas turbine engine of claim 7 wherein the flow reverser has a circumferentially extending non-uniform geometry.

9. A gas turbine engine comprising:
a rotor having at least one disk with a rotor defining a rotor axial face;
a stator having at least one ring with a stator axial face confronting the rotor axial face, with terminal portions of the axial faces forming a fluid outlet there between;
a recess formed in one of the rotor or stator axial faces to define a buffer cavity;
a wing extending into the buffer cavity from the other of the rotor or stator axial faces and having a surface confronting the fluid outlet; and
a flow reverser comprising a recess having circumferentially extending non-uniform geometry provided within at least one of the surface or the axial face of the other of the rotor or stator axial faces;
wherein the wing includes opposing radially inboard and outboard surfaces and the flow reverser extends radially inward an extent greater than the radially inboard surface.

10. The gas turbine engine of claim 9 wherein the flow reverser is located adjacent a junction between the surface and the terminal portion of the other of the axial faces.

11. The gas turbine engine of claim 9 wherein the flow reverser is located at a junction between the surface and the terminal portion of the other of the axial faces.

12. The gas turbine engine of claim 9 wherein the flow reverser is formed in the other of the axial faces.

13. The gas turbine engine of claim 9 wherein the flow reverser is formed in the surface.

14. The gas turbine engine of claim 13 wherein the flow reverser is axially offset from the terminal portion of the other of the axial faces.

15. The gas turbine engine of claim 9 wherein the surface has at least one of a smooth arcuate, wavy, or undulating profile.

16. The gas turbine engine of claim 9 wherein the surface has a circumferential non-uniform shape that is at least one of periodic, varied, or sinusoidal.

17. The gas turbine engine of claim 9 wherein the wing extends from the axial face of the rotor and the recess is formed in the axial face of the stator.

18. The gas turbine engine of claim 9 wherein the flow reverser extends axially inward from the rotor or stator axial face from which the wing extends.

* * * * *